United States Patent
Tanaka et al.

(10) Patent No.: US 12,507,977 B2
(45) Date of Patent: Dec. 30, 2025

(54) ULTRASOUND DIAGNOSTIC APPARATUS AND OPERATION CONDITION SETTING METHOD

(71) Applicant: FUJIFILM Healthcare Corporation, Kashiwa (JP)

(72) Inventors: Tomohiko Tanaka, Chiba (JP); Tetsuya Yamada, Chiba (JP); Hideki Yoshikawa, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 243 days.

(21) Appl. No.: 18/115,956

(22) Filed: Mar. 1, 2023

(65) Prior Publication Data

US 2023/0293139 A1 Sep. 21, 2023

(30) Foreign Application Priority Data

Mar. 15, 2022 (JP) ................................. 2022-040481

(51) Int. Cl.
*A61B 8/06* (2006.01)
*A61B 8/00* (2006.01)

(52) U.S. Cl.
CPC .............. *A61B 8/06* (2013.01); *A61B 8/488* (2013.01)

(58) Field of Classification Search
CPC ......... A61B 8/06; A61B 8/488; A61B 8/5223; A61B 8/54
See application file for complete search history.

(56) References Cited

U.S. PATENT DOCUMENTS

| | | | |
|---|---|---|---|
| 2012/0046548 A1* | 2/2012 | Hao | A61B 8/4461 600/440 |
| 2014/0221832 A1* | 8/2014 | El-Zehiry | A61B 8/54 600/437 |
| 2021/0096243 A1* | 4/2021 | Gafner | G01S 15/89 |
| 2021/0174496 A1* | 6/2021 | Annangi | A61B 8/5223 |
| 2024/0164756 A1* | 5/2024 | Sethuraman | A61B 8/465 |

FOREIGN PATENT DOCUMENTS

| | | |
|---|---|---|
| JP | H08-154935 A | 6/1996 |
| JP | 2004-073672 A | 3/2004 |
| JP | 2005-102718 A | 4/2005 |
| JP | 2013-027454 A | 2/2013 |
| JP | 2018-015024 A | 2/2018 |
| JP | 2018-186923 A | 11/2018 |
| JP | 2019-130050 A | 8/2019 |
| JP | 2020-092739 A | 6/2020 |

OTHER PUBLICATIONS

Japanese official action issued on Nov. 19, 2024 in connection with counterpart Japanese Patent Application No. 2022-040481.

* cited by examiner

*Primary Examiner* — Brooke Lyn Klein
(74) *Attorney, Agent, or Firm* — Paul Teng (57) ABSTRACT

A reception data array composed of a plurality of items of reception data corresponding to a plurality of transmission/reception conditions is generated. For each of the plurality of items of reception data, a plurality of units of data processing are applied to that item of reception data according to a plurality of data processing conditions. A blood flow data set is thereby generated from the reception data array. By evaluating the blood flow data set, an optimum transmission/reception condition and an optimum data processing condition are determined.

12 Claims, 9 Drawing Sheets

ULTRASOUND DIAGNOSTIC APPARATUS AND OPERATION CONDITION SETTING METHOD

CROSS REFERENCE TO RELATED APPLICATION

This application claims priority to Japanese Patent Application No. 2022-040481 filed on Mar. 15, 2022, which is incorporated herein by reference in its entirety including the specification, claims, drawings, and abstract.

TECHNICAL FIELD

The present disclosure relates to an ultrasound diagnostic apparatus and an operation condition setting method and, in particular, relates to optimization of operation conditions.

BACKGROUND

A typical ultrasound diagnostic apparatus has multiple operation modes, and such multiple operation modes typically include a color flow mapping mode (CFM mode). The CFM mode is a mode in which a combined image that is composed of a monochrome tomographic image and a color blood flow image superimposed thereon is displayed. The CFM mode is also referred to as a color Doppler mode.

To obtain a good blood flow image in the CFM mode, operation conditions that are set for the ultrasound diagnostic apparatus should be optimized in accordance with the subject or purpose of inspection. In particular, both transmission/reception conditions and data processing conditions should be optimized.

The transmission/reception conditions are ultrasound transmission conditions and ultrasound reception conditions for obtaining Doppler information. The data processing conditions are signal and data processing conditions for imaging Doppler information. Examples of the transmission conditions include a pulse repetition time (PRT) (pulse repetition frequency (PRF)). Examples of the data processing conditions include a cutoff frequency of a filter that suppresses a clutter component (a strong component originating from slowly moving tissue) included in a reception signal.

When, for example, veins in the kidneys or veins in the lower limbs are to be observed, the transmission/reception conditions and the data processing conditions that are not appropriately set result in a CFM image in which almost none of the veins are rendered in color or in which excess objects such as soft tissue are rendered in color.

It is not necessarily easy for a user (such as a physician or a clinical examination technician), who is an inspector, to manually optimize the transmission/reception conditions and the data processing conditions to suit various circumstances. This problem becomes more significant when more and more parameters are to be adjusted.

An ultrasound diagnostic apparatus disclosed in Document 1 (JP 2013-27454 A) has a function of automatically setting the PRF based on Doppler shift distribution data. An ultrasound diagnostic apparatus disclosed in Document 2 (JP 2004-73672 A) has a function of automatically setting conditions for removing a clutter component. An ultrasound diagnostic apparatus disclosed in Document 3 (JP H8-154935 A) includes a CFM calculation unit with a decimator. None of these documents discloses a technique of simultaneously optimizing the transmission/reception conditions and the data processing conditions in the CFM mode.

SUMMARY

To obtain a good blood flow image, the transmission/reception conditions and the data processing conditions should be optimized. However, manually optimizing both the transmission/reception conditions and the signal processing conditions simultaneously is not easy.

The present disclosure is directed toward automatically optimizing the transmission/reception conditions and the data processing conditions to reduce the burden on the user. Alternatively, the present disclosure is directed toward automatically and rapidly optimizing the transmission/reception conditions and the data processing conditions for performing the CFM mode.

According to one aspect of the present disclosure, there is provided an ultrasound diagnostic apparatus comprising a first generator that generates a reception data array that is composed of a plurality of items of reception data corresponding to a plurality of transmission/reception conditions; a second generator that generates, for each of the plurality of items of reception data, a plurality of items of blood flow data by applying a plurality of units of data processing to that item of reception data according to a plurality of data processing conditions, thereby generating a blood flow data set from the reception data array; an evaluator that evaluates the blood flow data set, thereby determining an optimum transmission/reception condition and an optimum data processing condition; and a setter that sets the optimum transmission/reception condition and the optimum data processing condition for the ultrasound diagnostic apparatus.

According to another aspect of the present disclosure, there is provided a method of setting an operation condition for an ultrasound diagnostic apparatus, the method comprising generating a reception data array that is composed of a plurality of items of reception data corresponding to a plurality of transmission/reception conditions; generating, for each of the plurality of items of reception data, a plurality of items of blood flow data by applying a plurality of units of data processing to that item of reception data according to a plurality of data processing conditions, thereby generating a blood flow data set from the reception data array; evaluating the blood flow data set, thereby determining an optimum transmission/reception condition and an optimum data processing condition; and setting the optimum transmission/reception condition and the optimum data processing condition for the ultrasound diagnostic apparatus.

BRIEF DESCRIPTION OF DRAWINGS

Embodiments of the present disclosure will be described based on the following figures, wherein.

DESCRIPTION OF EMBODIMENTS

Embodiments of the present disclosure will be described below with reference to the accompanying drawings.

(1) Overview of Embodiments

An ultrasound diagnostic apparatus according to an embodiment of the present disclosure includes a first generation unit, a second generation unit, an evaluation unit, and a setting unit. The first generation unit generates a reception data array that is composed of a plurality of items of reception data corresponding to a plurality of transmission/reception conditions. The second generation unit generates, for each item of reception data, a plurality of items of blood flow data by applying a plurality of units of data processing to that item of reception data according to a plurality of data processing conditions, thereby generating a blood flow data set from the reception data array. The evaluation unit evaluates the blood flow data set, thereby determining an optimum transmission/reception condition and an optimum data processing condition. The setting unit sets the optimum transmission/reception condition and the optimum data processing condition for the ultrasound diagnostic apparatus. The above-described first generation unit serves as the first generator. The above-described second generation unit serves as the second generator. The above-described evaluation unit serves as the evaluator. The above-described setting unit serves as the setter.

A plurality of condition combinations are defined based on a plurality of transmission/reception conditions and a plurality of data processing conditions. The above-described structure enables automatic generation of a plurality of items of blood flow data corresponding to a plurality of condition combinations and automatic determination and setting of an optimum transmission/reception condition and an optimum data processing condition through evaluation of the plurality of items of blood flow data. As a result, the quality of a blood flow image is improved without putting a burden upon the user.

Even if an optimum transmission/reception condition is set, the quality of a blood flow image is not improved unless an optimum data processing condition is set. Similarly, even if an optimum data processing condition is set, the quality of a blood flow image is not improved unless an optimum transmission/reception condition is set. The above-described structure enables simultaneous optimization of the transmission/reception conditions and the data processing conditions.

The transmission/reception conditions are typically composed of one or a plurality of parameters that define transmission/reception of ultrasound. The data processing conditions are typically composed of one or a plurality of parameters that define data processing (including signal processing). Setting of an optimum condition refers to activation of an optimum condition. The target for which an optimum transmission/reception condition and an optimum data processing condition are set is the ultrasound diagnostic apparatus, and specifically is usually a transmission/reception unit and a data processing unit in the ultrasound diagnostic apparatus. For rapid data processing, reception data may be stored in a memory and successively retrieved from the memory so that a plurality of units of data processing can be successively applied to the same reception data.

In an embodiment, the first generation unit includes a transmission/reception unit and a processing unit. At least one actual transmission/reception condition is set for the transmission/reception unit. The transmission/reception unit outputs at least one item of actual reception data corresponding to at least one actual transmission/reception condition. The processing unit processes the at least one item of actual reception data, thereby generating at least one item of virtual reception data corresponding to at least one virtual transmission/reception condition. The above-described plurality of transmission/reception conditions are composed of the at least one actual transmission/reception condition and the at least one virtual transmission/reception condition. The above-described reception data array is composed of the at least one item of actual reception data and the at least one item of virtual reception data. The above-described transmission/reception unit corresponds to the transmission/reception circuit. The above-described processing unit serves as the processor.

If one or a plurality of items of virtual reception data can be generated from one item of actual reception data, the transmission/reception count can be reduced. The virtual reception data may be referred to as pseudo reception data.

It should be noted that a transmission/reception unit and a preprocessor, which will be described later, correspond to a first generation unit (first generator), or a transmission/reception unit, which will be described later, corresponds to a first generation unit (first generator). A blood flow image formation unit, which will be described later, corresponds to a second generation unit (second generator).

In an embodiment, the above-described at least one actual transmission/reception condition comprises a plurality of actual transmission/reception conditions. The above-described at least one item of actual reception data comprises a plurality of items of actual reception data. The above-described at least one virtual transmission/reception condition comprises a plurality of virtual transmission/reception conditions. The above-described at least one item of virtual reception data comprises a plurality of items of virtual reception data. This structure enables easy generation of many items of reception data corresponding to many condition combinations.

In an embodiment, each item of actual reception data includes a plurality of packets that are successive on a time axis, the plurality of packets obtained under the same actual transmission/reception condition. The processing unit applies packet decimation processing to each item of actual reception data, thereby generating one or a plurality of items of virtual reception data from each item of actual reception data.

During tentative measurement for searching for an optimum condition combination, transmission of ultrasound and reception of reflected waves occur along one or a plurality of sound rays. A plurality of items of reception beam data that are successively obtained from the same sound ray under the same actual transmission/reception condition form a packet array. Typically, motion information is generated by applying autocorrelation operation and other processing to a Doppler data array that is extracted from a packet array. The packet decimation processing corresponds to the increase in pulse repetition time (PRT) (the reduction in pulse repetition frequency (PRF)). The above-described structure enables obtainment of reception data that is similar to reception data obtained when the PRT is varied, without actually varying the PRT.

The tentative measurement is followed by main measurement (actual measurement). The tentative measurement and the main measurement are consecutively performed on the same subject. When an inspector manually searches for an optimum condition combination, in some cases, the searching may take long time or may result in a situation in which any optimum condition combination cannot be identified. An ultrasound diagnostic apparatus according to an embodiment of the present disclosure can avoid such problems and can reduce the burdens on both the inspector and the subject.

In an embodiment, the evaluation unit includes a calculation unit and a determination unit. The calculation unit calculates, for each item of blood flow data, an evaluation value based on that item of blood flow data. The determination unit determines an optimum transmission/reception condition and an optimum data processing condition based on a plurality of evaluation values corresponding to a plurality of items of blood flow data. For evaluation of individual items of blood flow data, that is, evaluation of individual condition combinations, many different evaluation methods may be used. Examples of the evaluation value that may be used include an evaluation value that is reflective of a ratio between a blood flow signal and a non-blood flow signal (SN ratio), an evaluation value that is reflective of a proportion of a blood flow image in a blood flow area, and an evaluation value that is reflective of an amount by which a blood flow image extends off a blood flow area. The calculation unit serves as the calculator. The determination unit serves as the determiner. It should be noted that an optimum condition searching unit, which will be described later, corresponds to the evaluation unit (evaluator) and the setting unit (setter) and corresponds to the calculation unit (calculator) and the determination unit (determiner).

In an embodiment, a reference area is set for a blood flow area on a beam scanning plane. The above-described calculation unit refers, for each item of blood flow data, to a portion corresponding to the reference area in that item of blood flow data as blood flow information and refers, for each item of blood flow data, to all of that item of blood flow data or a portion other than the portion corresponding to the reference area in that item of blood flow data as comparative information. For each item of blood flow data, an evaluation value is then calculated based on the blood flow information and the comparative information.

The reference area is set manually or automatically. The reference area is a one-dimensional area, a two-dimensional area, or a three-dimensional area. The reference area may be composed of several pixels or tens of pixels that are successive on a particular sound ray. The reference area may be set across a plurality of sound rays. Other than the reference area, a comparative area is set. The comparative area, which is compared with the reference area, is a one-dimensional area, a two-dimensional area, or a three-dimensional area. The comparative area may be set as an area that is different from and does not include the reference area, and when the reference area is relatively small, the comparative area may be set as an area that includes the reference area. It should be noted that the portion corresponding to the reference area in the blood flow data is a portion of interest, and the portion other than the portion corresponding to the reference area in the blood flow data is a portion that is different from the portion of interest.

In an embodiment, each transmission/reception condition includes a pulse repetition time. Each data processing condition includes a filter characteristic. The optimum transmission/reception condition includes an optimum pulse repetition time. The optimum data processing condition includes an optimum filter characteristic.

A method of setting an operation condition for an ultrasound diagnostic apparatus according to an embodiment of the present disclosure includes a first generation step, a second generation step, an evaluation step, and a setting step. The first generation step comprises generating a reception data array that is composed of a plurality of items of reception data corresponding to a plurality of transmission/reception conditions. The second generation step comprises generating, for each item of reception data, a plurality of items of blood flow data by applying a plurality of units of data processing to that item of reception data according to a plurality of data processing conditions. A blood flow data set is thereby generated from the reception data array. The evaluation step comprises evaluating the blood flow data set, thereby determining an optimum transmission/reception condition and an optimum data processing condition. The setting step comprises setting the optimum transmission/reception condition and the optimum data processing condition for the ultrasound diagnostic apparatus.

The above-described method enables rapid determination and setting of a condition combination that is optimum for a subject prior to performing main measurement on the subject when the CFM mode is selected.

(2) Details of Embodiments

Figure 1:
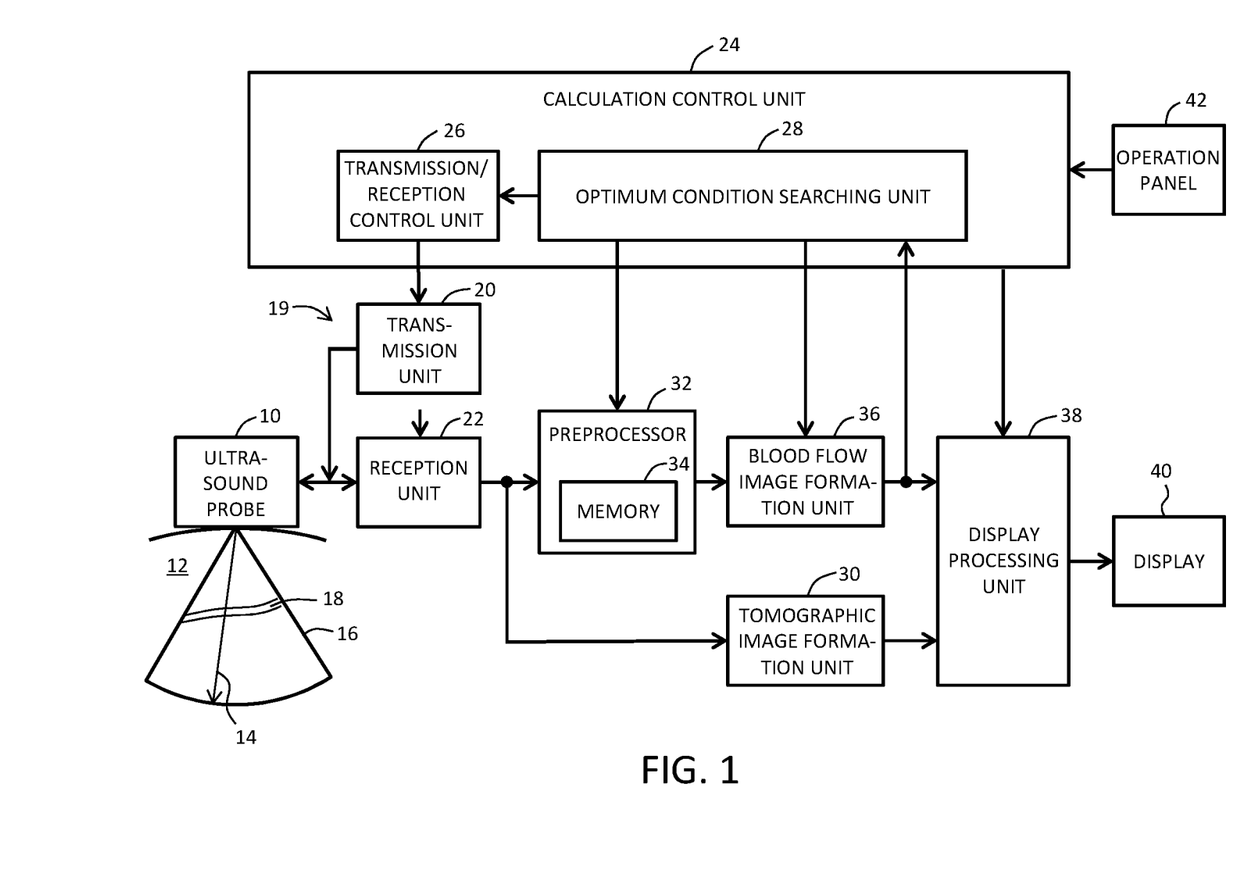
FIG. 1 is a block diagram illustrating an ultrasound diagnostic apparatus according to an embodiment of the present disclosure.

FIG. 1 illustrates an ultrasound diagnostic apparatus according to an embodiment of the present disclosure. This ultrasound diagnostic apparatus is a medical apparatus for performing ultrasound inspection on a subject in a healthcare facility such as a hospital. The ultrasound diagnostic apparatus has multiple operation modes, including the CFM mode. In the CFM mode, a color blood flow image is superimposed on a monochrome tissue tomographic image, and a combined image thereby generated is displayed. The following description focuses on the structure and the operation associated with the CFM mode.

While in contact with a living body 12, an ultrasound probe 10 transmits ultrasound waves to the living body 12 and receives reflected waves from the living body 12. The ultrasound probe 10 includes a transducer array consisting of a plurality of transducers that are arranged in a linear array or in an arc array. An ultrasound beam 14 is formed by the transducer array, and the ultrasound beam 14 is electronically scanned. Examples of known electronically scanning methods include an electronic linear scanning method and an electronic sector scanning method. A beam scanning plane 16 is repeatedly formed by repeatedly electronically scanning the ultrasound beam. To enable obtaining volume data from the living body 12, the ultrasound probe 10 may include a two-dimensional transducer array.

The ultrasound diagnostic apparatus according to an embodiment of the present disclosure has a function of, when the CFM mode is selected, performing tentative measurement prior to main measurement, thereby setting an optimum condition combination. For the tentative measurement, an ultrasound beam may be formed repeatedly along a particular sound ray (particular scanning line), and electronic scanning of the ultrasound beam may be repeated in a narrow scanning area corresponding to a reference area, which will be described later. It should be noted that the main measurement corresponds to an inspection step in which ultrasound inspection is performed on a subject, and the tentative measurement corresponds to a preparatory step (or a tuning step) that precedes the main measurement.

In the illustrated example, the beam scanning plane 16 includes a cross section of a blood vessel 18. The blood vessel 18 is, for example, a vein in the kidney or a vein in the lower limb. For imaging a blood flow that flows in such a blood vessel, many parameters should be optimized. Such operation is typically difficult and takes time. To resolve or reduce such problems, the above-described function of setting an optimum condition combination is provided.

A transmission/reception unit 19 is composed of a transmission unit 20 and a reception unit 22. The transmission unit 20 is an electronic circuit that supplies a plurality of transmission signals to a plurality of transducers in parallel with each other during transmission. In response to supply of a plurality of transmission signals, a transmission beam is formed. The reception unit 22 is an electronic circuit that generates reception beam data by processing a plurality of reception signals output from the plurality of transducers in parallel with each other during reception. The processing performed by the reception unit 22 includes phase alignment and summing (delay and summing), quadrature detection, and other processing. The reception beam data is composed of a plurality of items of echo data that are successive in the depth direction.

A plurality of items of reception beam data for tomographic image formation are successively output from the reception unit 22 to a tomographic image formation unit 30. The tomographic image formation unit 30 includes a digital scan converter (DSC) that forms a tomographic image based on the plurality of items of reception beam data. The DSC has a coordinate conversion function, a pixel interpolation function, a frame rate conversion function, and other functions. The tomographic image is an image that represents a soft tissue structure in a living body. Data representing the tomographic image is transmitted from the tomographic image formation unit 30 to a display processing unit 38.

During the main measurement, a preprocessor 32 does not function, and a plurality of items of reception beam data for blood flow image formation are output from the reception unit 22 to a blood flow image formation unit 36. The blood flow image formation unit 36 forms a blood flow image based on the plurality of items of reception beam data. The blood flow image formation unit 36 includes a clutter filter, an autocorrelator, a DSC, and others.

Specifically, during the main measurement, a plurality of items of reception beam data (a plurality of packets) are continuously obtained for each sound ray under the same transmission/reception condition. In other words, one packet array is obtained for each sound ray. The obtainment of a packet array is repeated while the sound ray address is switched along the electronic scanning direction. Based on the plurality of packet arrays thereby obtained, the blood flow image formation unit 36 generates a reception blood flow image.

The blood flow image formation unit 36 according to an embodiment of the present disclosure has a function of forming a plurality of types of blood flow images. The plurality of types of blood flow images include a blood flow image representing a velocity distribution (two-dimensional distribution of blood flow velocity) on the beam scanning plane, an auxiliary blood flow image representing a dispersion distribution (two-dimensional distribution of blood flow velocity dispersion) on the beam scanning plane, a blood flow image representing a power distribution (two-dimensional distribution of blood flow power) on the beam scanning plane, and other blood flow images. A particular blood flow image selected by the user is displayed. A blood flow image representing a velocity distribution and a dispersion distribution may be displayed. Data representing a blood flow image is transmitted to the display processing unit 38.

In the calculation of blood flow information, one packet array constitutes one unit of data in terms of data processing. In the following description, a packet array is sometimes referred to as reception data.

During the tentative measurement, a plurality of items of reception data (a plurality of packet arrays) corresponding to a plurality of transmission/reception conditions are generated, and a plurality of data processing conditions are applied to each item of reception data (each packet array). As a result, a plurality of items of blood flow data corresponding to a plurality of condition combinations are generated.

For example, to optimize only the PRT that serves as a transmission/reception condition, at least one item of reception data is obtained from a particular sound ray that passes through a reference area, which will be described later. To optimize the PRT and the wave number individually as transmission/reception conditions, at least two items of reception data are obtained from the particular sound ray. It should be noted that, in either case, a plurality of packet arrays may be obtained from a plurality of sound rays that pass through a reference area.

The preprocessor 32 has a function of performing packet decimation processing. The packet decimation processing enables generation of one or a plurality of items of reception data (virtual reception data) corresponding to one or a plurality of virtual PRTs from actually obtained reception data (actual reception data) obtained under an actually set PRT (actual PRT).

For example, a ½ PRT is virtually implemented by decimation to ½, and a ⅓ PRT is virtually implemented by decimation to ⅓. A virtual packet array may also be referred to as an artificial packet array or a pseudo packet array. The above-described packet decimation processing enables a reduction in the transmission/reception count for searching for an optimum condition combination, thereby enabling a shorter tentative measurement time.

The preprocessor 32 includes a memory 34. The memory 34 stores actual reception data. The memory 34 also stores one or a plurality of generated items of virtual reception data. The stored items of reception data are retrieved repeatedly. It should be noted that a plurality of PRTs may be set sequentially without using the packet decimation processing.

A reception data array that is composed of an item of actual reception data and one or a plurality of items of virtual reception data is generated during the tentative measurement. The blood flow image formation unit 36 applies a plurality of units of data processing to individual items of reception data that constitute the reception data array. As a result, a blood flow data set composed of a plurality of items of blood flow data is generated. Individual items of blood flow data that constitute the blood flow data set are transmitted to an optimum condition searching unit 28.

What data processing is performed in the blood flow image formation unit 36 is defined by a plurality of parameters. Examples of the plurality of parameters include a parameter that defines a characteristic of a clutter filter, a parameter that defines a threshold level in threshold processing, a parameter that defines a gain of blood flow data, and a parameter that defines a characteristic of logarithmic conversion. These parameters, all or in part, are to be optimized.

The display processing unit 38 has an image combining function, a color calculation function, and other functions. During the main measurement, the display processing unit 38 generates a CFM image by superimposing a color blood flow image on a monochrome tomographic image. The CFM image is displayed on a display 40. During the tentative measurement, for example, no blood flow information is displayed, and only a tomographic image is displayed in the form of a still-frame image. However, individual items of blood flow data generated during the tentative measurement may be displayed. For example, a plurality of blood flow images corresponding to a plurality of condition combinations may be displayed in a list view.

A calculation control unit 24 is composed of, for example, a processor (specifically, a CPU) that executes a program. The calculation control unit 24 controls the operation of each of the structural components illustrated in FIG. 1. The calculation control unit 24 has multiple functions. Among those functions, two representative functions are shown in FIG. 1 as a transmission/reception control unit 26 and the optimum condition searching unit 28.

The transmission/reception control unit 26 sets transmission/reception conditions for the transmission unit 20 and the reception unit 22. Examples of the transmission/reception conditions include a pulse repetition time (PRT), a wave number (number of waves that constitute a transmission pulse), a transmission voltage, and a reception gain. These are all parameters, and all or some portion are to be optimized.

The optimum condition searching unit 28 controls the tentative measurement, and specifically, controls the transmission/reception of ultrasound via the transmission/reception control unit 26 during the tentative measurement and controls the data processing performed in the blood flow image formation unit 36. The optimum condition searching unit 28 serves as the evaluation unit (evaluator) and the setting unit (setter). Specifically, the optimum condition searching unit 28 calculates a plurality of evaluation values based on a plurality of items of blood flow data, and determines an optimum transmission/reception condition and an optimum data processing condition based on the plurality of evaluation values. After that, the optimum condition searching unit 28 instructs the optimum transmission/reception condition to the transmission/reception control unit 26 and instructs the optimum data processing condition to the blood flow image formation unit 36. The main measurement is then performed.

An operation panel 42 may include a trackball, a plurality of switches, a keyboard, and other input devices. The operation panel 42 includes a button for instructing the start of optimum condition searching. The display 40 is composed of, for example, an organic EL device or a liquid crystal display. It should be noted that each of the tomographic image formation unit 30, the preprocessor 32, the blood flow image formation unit 36, and the display processing unit 38 may be composed of a processor. The tomographic image formation unit 30, the preprocessor 32, the blood flow image formation unit 36, and the display processing unit 38 may be implemented in the form of the functions of the calculation control unit (CPU) 24.

Figure 2:
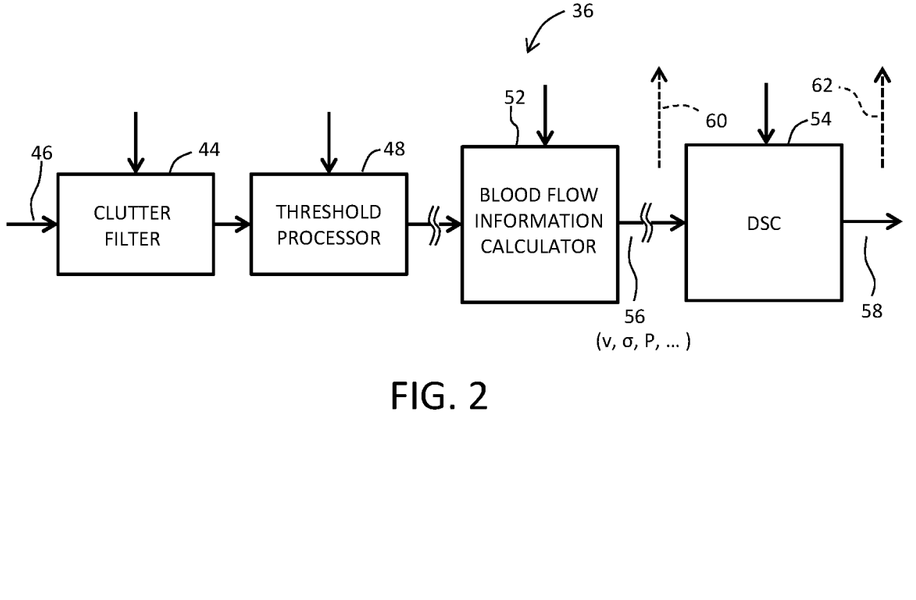
FIG. 2 is a block diagram illustrating an example structure of a blood flow image formation unit.

FIG. 2 illustrates an example structure of the blood flow image formation unit 36. FIG. 2 illustrates a clutter filter 44, a threshold processor 48, a blood flow information calculator 52, and a DSC 54. The operation of these is controlled by the above-described calculation control unit. The blood flow image formation unit 36 further includes a gain adjuster, a logarithmic converter, and others, but they are not illustrated in the figure.

The clutter filter 44 is a filter that removes or suppresses a clutter component included in blood flow data (specifically, individual items of reception beam data) 46. The clutter component is a component produced by an echo from slowly moving soft tissue. The clutter filter 44 is also referred to as a wall motion filter. The cutoff frequency is changed by changing a first parameter given to the clutter filter 44, and the steepness of the filter characteristic is changed by changing a second parameter given to the clutter filter 44.

The threshold processor 48 applies threshold processing to the blood flow data output from the clutter filter 44. For example, a component that is less than or equal to a threshold value is removed, or a component that is greater than or equal to a threshold value is removed. The threshold value is changed by changing a parameter given to the threshold processor 48.

The blood flow information calculator 52 includes an autocorrelator, a velocity calculator, a dispersion calculator, a power calculator, and others. The blood flow information calculator 52 generates blood flow data 56 from reception data. The blood flow data 56 includes velocity information v, dispersion information 6, and power information P.

During the main measurement, the DSC 54 generates blood flow image data 58 based on a plurality of spatially successive items of blood flow data. The blood flow image data is transmitted to the display processing unit. The blood flow image data is, for example, data representing a two-dimensional distribution of velocity, data representing a two-dimensional distribution of velocity and dispersion, or data representing a two-dimensional distribution of power.

During the tentative measurement, blood flow data 60 output from the blood flow information calculator 52 or blood flow image data 62 output from the DSC 54 is transmitted to the optimum condition searching unit 28. For example, a gain adjuster and a logarithmic converter may be provided downstream of the DSC 54; when processing performed in them is also to be optimized, the blood flow image data 62 that have passed through them is transmitted to the optimum condition searching unit 28.

Figure 3:
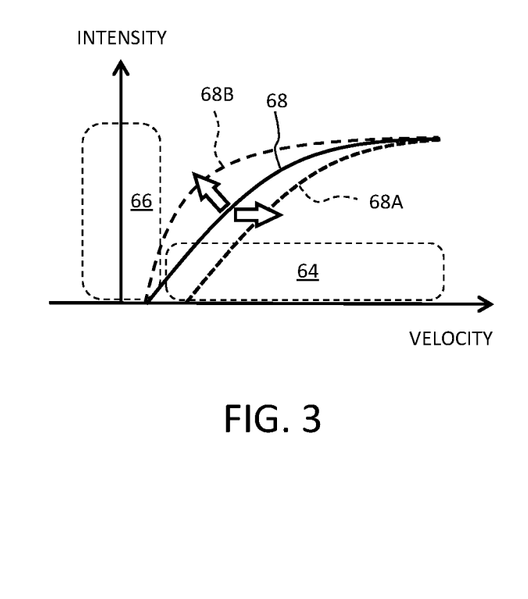
FIG. 3 illustrates a filter characteristic of a clutter filter.

FIG. 3 illustrates a filter characteristic 68 of the clutter filter. The horizontal axis is a velocity axis, and the vertical axis is an intensity axis. These two axes define a two-dimensional space in which the intensity of a blood flow component 64 is considerably lower than the intensity of a clutter component 66. Therefore, effective suppression of the clutter component 66 is demanded. In accordance with the blood flow component 64 and the clutter component 66, for example, the cutoff frequency is raised (see reference numeral 68A). For example, the steepness (gradient angle of the rise) of the filter characteristic is increased (see reference numeral 68B). Such adjustments are performed by changing the first parameter and the second parameter described above.

Figure 4:
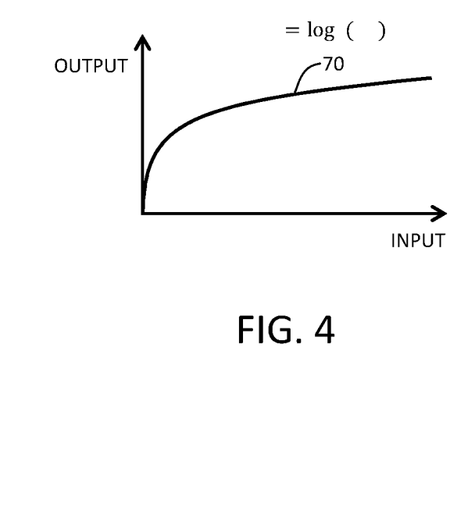
FIG. 4 illustrates a conversion characteristic of a logarithmic converter.

FIG. 4 illustrates a characteristic of a logarithmic converter 70. The horizontal axis is an input axis, and the vertical axis is an output axis. The characteristic may be defined by the equation given in the figure; in that case, parameter a and parameter c in this equation are changed according to the circumstances.

Although all parameters given to the blood flow image formation unit 36 may be targets for optimization, in terms of shortening the tentative measurement time, it is preferable that only some portion be targets to be optimized. The remaining parameters may be adjusted manually as needed.

Figure 5:
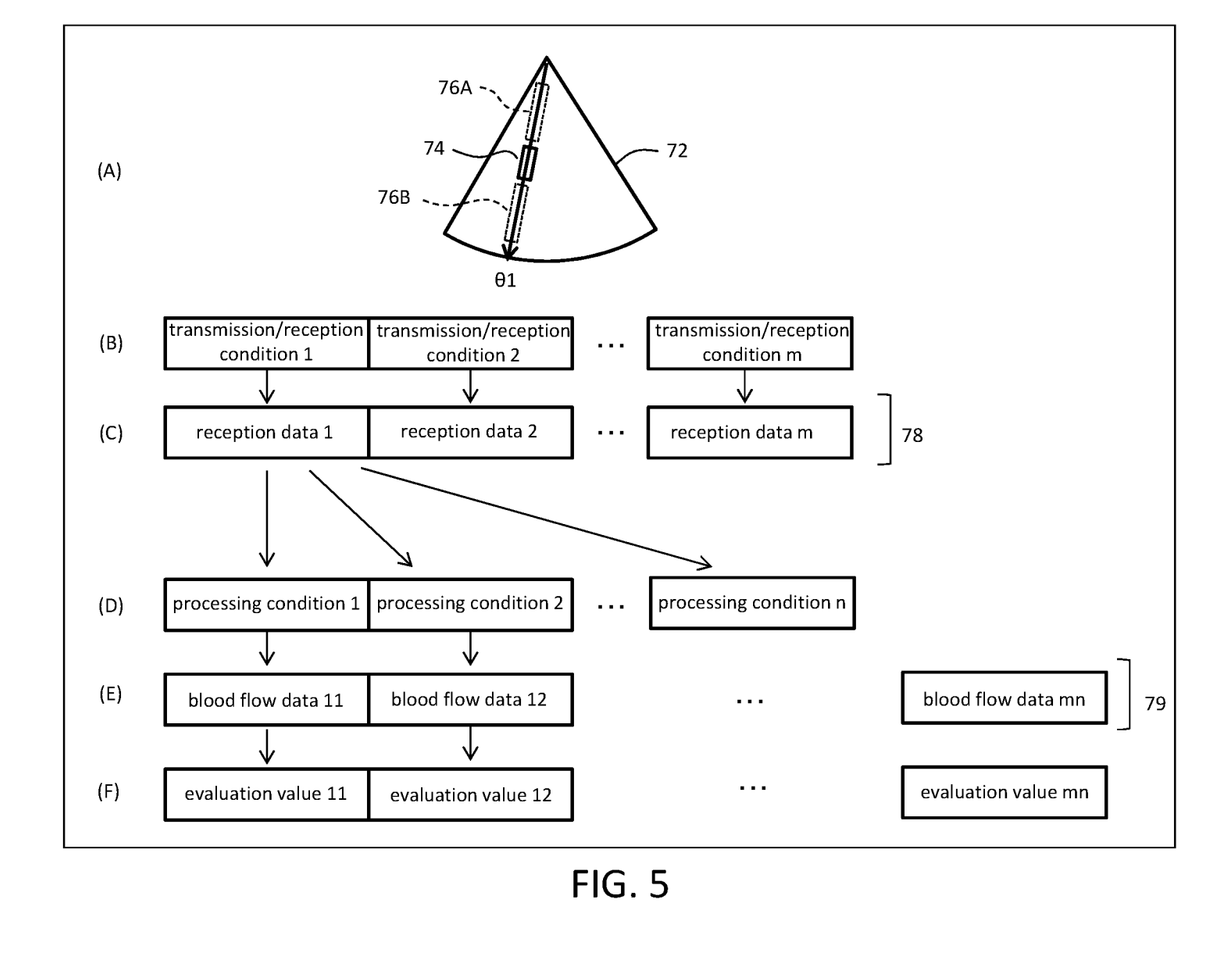
FIG. 5 illustrates a first reception data processing method.

Reception data processing methods will now be described below. FIG. 5 illustrates a first reception data processing method. In the first reception data processing method, packet decimation processing is not performed.

(A) illustrates setting of a reference area 74. For example, while referring to a tomographic image, a user sets a one-dimensional reference area 74 in a beam scanning plane 72. A sound ray (scanning line or beam azimuth) that passes through the reference area 74 is denoted by θ1. The reference area 74 may be set automatically. In the illustrated example, comparative areas 76A and 76B are set automatically on the sound ray θ1 before and after the reference area 74. They may be set by the user. The entire sound ray θ1 may be set as a comparative area. The reference area 74 and the comparative areas 76A and 76B may be each set as a two-dimensional area.

(B) illustrates a plurality of transmission/reception conditions that are different from each other. In the illustrated example, a number m of transmission/reception conditions, including transmission/reception condition 1 to transmission/reception condition m, are set sequentially. (C) illustrates a number m of items of reception data that are successively obtained under the number m of transmission/reception conditions; that is, reception data 1 to reception data m. They constitute a reception data array 78. (D) illustrates, for each item of reception data, a number n of data processing conditions that are applied to that item of reception data and that are different from each other; that is, data processing condition 1 to data processing condition n. Values m and n are each an integer of 2 or greater.

(E) illustrates a number m×n of items of blood flow data generated by applying a number n of units of data processing to each of the number m of items of reception data; that is, blood flow data 11 to blood flow data mn. These constitute a blood flow data set 79. (F) illustrates a number m×n of evaluation values calculated based on the number m×n of items of blood flow data; that is, evaluation value 11 to evaluation value mn.

An item of blood flow data from which the best evaluation value is generated is determined from among the number m×n of items of blood flow data, and an optimum condition combination is determined based on that item of blood flow data. Specifically, an optimum transmission/reception condition and an optimum data processing condition are determined.

Figure 6:
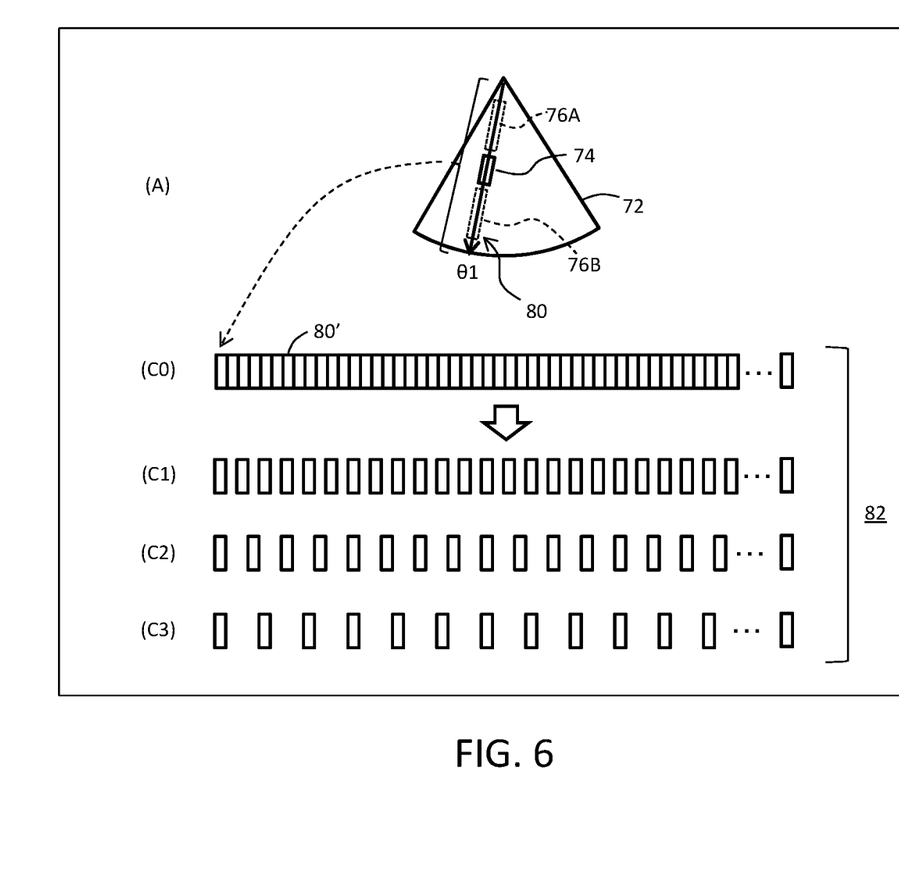
FIG. 6 illustrates a second reception data processing method.

FIG. 6 illustrates a second reception data processing method. In the second reception data processing method, packet decimation processing is performed. In the illustrated example, the PRT is the sole transmission/reception parameter serving as a target to be changed.

(A) illustrates setting of a reference area 74. Comparative areas 76A and 76B are set on a sound ray θ1 in a scanning plane 72 before and after the reference area 74. One item of reception beam data 80 obtained from the sound ray θ1 constitutes one packet. (C0) illustrates an actual packet array (actual reception data) obtained from the sound ray θ1. The actual packet array is composed of a plurality of packets 80' that are successive on a time axis.

One or a plurality of virtual packet arrays are generated by applying packet decimation processing to the actual packet array. (C1) illustrates a virtual packet array generated when a ½ decimation rate is used, (C2) illustrates a virtual packet array generated when a ⅓ decimation rate is used, and (C3) illustrates a virtual packet array generated when a ¼ decimation rate is used. A 1/i decimation rate corresponds to an i-times PRT (1/i PRF). i is an integer of 2 or greater.

A reception data array 82 is composed of an actual packet array and a plurality of virtual packet arrays generated from that actual packet array. The reception data array 82 is composed of a number m of items of reception data. A number n of units of data processing are applied to individual items of reception data. As a result, a number m×n of items of blood flow data are generated, and through individual evaluation of them, an optimum PRF and an optimum data processing condition are determined.

Figure 7:
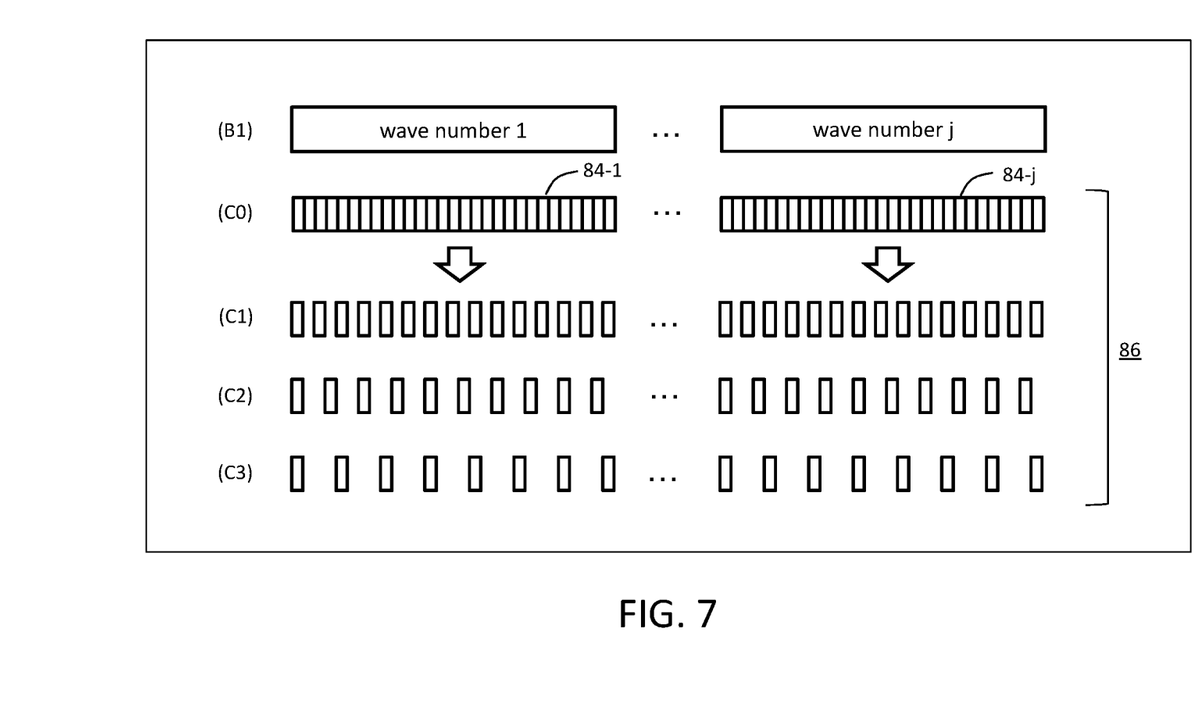
FIG. 7 illustrates a third reception data processing method.

FIG. 7 illustrates a third reception data processing method. In the third reception data processing method, packet decimation processing is performed. In the illustrated example, transmission/reception parameters serving as targets to be optimized are the PRT and the wave number. The wave number is a number of waves that constitute a transmission pulse, and corresponds to a wave train length. (B1) illustrates wave number 1 to wave number j. Value j is an integer of 2 or greater.

Through repeated transmission/reception while changing the wave number with the PRF being fixed, as illustrated in (C0), a number j of actual packet arrays, including actual packet array 84-1 to actual packet array 84-j, are obtained.

For each actual packet array, one or a plurality of virtual packet arrays are generated by applying packet decimation processing to the number j of actual packet arrays. (C1) illustrates a number j of virtual packet arrays generated when a ½ decimation rate is used, (C2) illustrates a number j of virtual packet arrays generated when a ⅓ decimation rate is used, (C3) illustrates a number j of virtual packet arrays generated when a ¼ decimation rate is used.

A reception data array 86 is composed of an actual packet array and a plurality of virtual packet arrays generated from that actual packet array. The reception data array 86 is composed of a number m of items of reception data. A number n of units of data processing are applied to individual items of reception data. As a result, a number m×n of items of blood flow data are generated, and through individual evaluation of them, optimum transmission/reception conditions (optimum PRF and optimum wave number) and optimum data processing conditions are determined.

Figure 8:
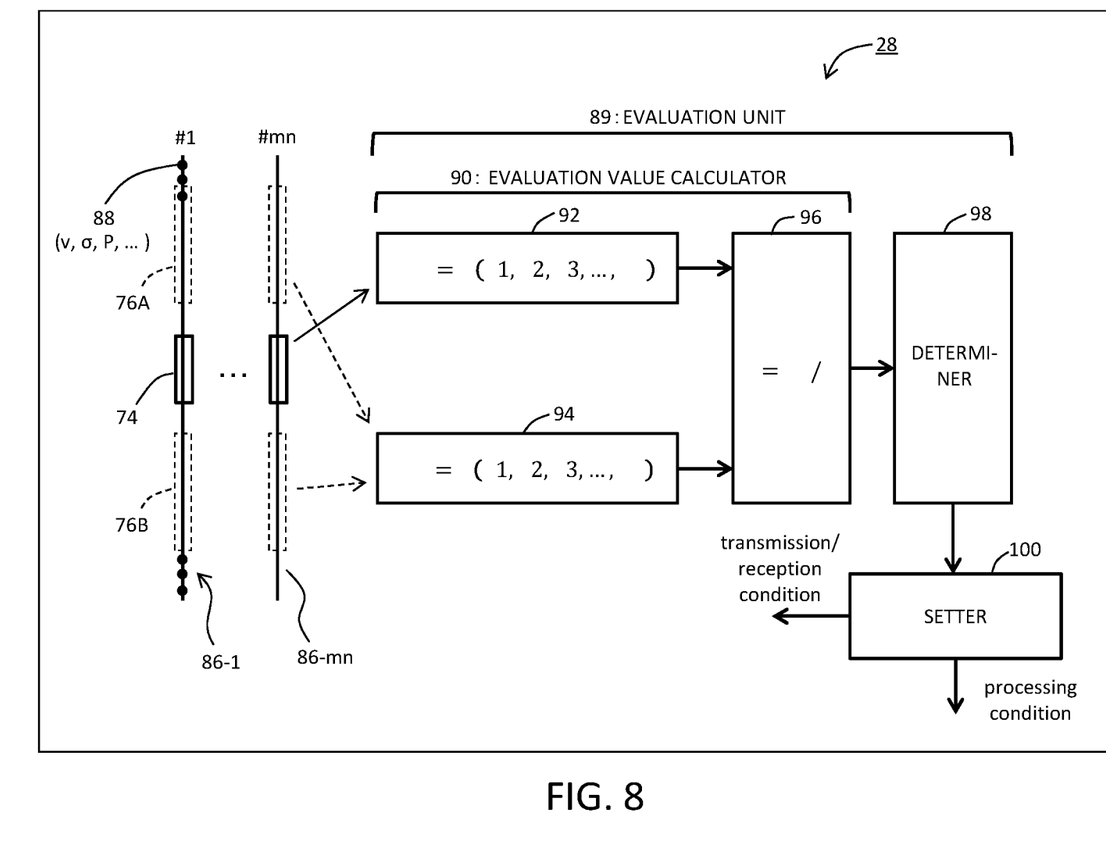
FIG. 8 illustrates an example structure of an optimum condition searching unit.

FIG. 8 schematically illustrates the operation of the optimum condition searching unit 28. During the tentative measurement, the optimum condition searching unit 28 performs switching setting of a number m of transmission/reception conditions, switching control of a number n of units of data processing, evaluation of a number m×n of items of blood flow data, determination of an optimum condition combination, and setting of an optimum condition combination.

FIG. 8 illustrates blood flow data 86-1 to blood flow data 86-$mn$ corresponding to condition combination #1 to condition combination #mn. Each item of blood flow data is composed of a plurality of items of pixel data 88. An individual item of pixel data 88 includes velocity information, dispersion information, power information, and other information. In each item of blood flow data, a portion in a reference area 74 is extracted as reference information. The reference area 74 is set in a blood flow area. The reference area 74 has a size of, for example, several pixels or tens of pixels. Other than the reference area 74, comparative areas 76A and 76B are set, and comparative information is extracted from these areas. The comparative areas 76A and 76B are set in a non-blood flow area.

The optimum condition searching unit 28 includes an evaluation value calculator 90, a determiner 98, and a setter 100. The evaluation value calculator 90 and the determiner 98 constitute an evaluation unit 89. The evaluation value calculator 90 includes a first calculator 92, a second calculator 94, and a third calculator 96. The first calculator 92 calculates, for each item of blood flow data, a first coefficient $S_B$ based on the reference information. The second calculator 94 calculates, for each item of blood flow data, a second coefficient $S_C$ based on the comparative information. For calculation of the first coefficient $S_B$ and the second coefficient $S_C$, velocity information, dispersion information, power information, and other information may be referred to, all or in part. It should be noted that p1 to pk represent k number of parameters. The number k of parameters includes one or a plurality of parameters that define transmission/reception conditions and one or a plurality of parameters that define data processing conditions.

The third calculator 96 calculates, for example, $S_B/S_C$, thereby calculating an evaluation value E. The evaluation value E is a value indicative of the quality level of a blood flow image. A wide range of different evaluation values may be used as the evaluation value. Examples of evaluation values that may be used include an evaluation value that is indicative of a signal-to-noise ratio, an evaluation value that is indicative of a proportion of a blood flow image to a blood flow area, and an evaluation value that is indicative of an amount by which a blood flow image extends off a blood flow area. A comprehensive evaluation value may be calculated based on a plurality of evaluation values.

The determiner 98 determines, from among the number m×n of evaluation values, the best evaluation value; for example, the maximum evaluation value. The transmission/reception condition and the data processing condition under which the maximum evaluation value is generated are determined as an optimum transmission/reception condition and an optimum data processing condition. The setter 100 instructs the optimum transmission/reception condition to the transmission/reception control unit and instructs the optimum data processing condition to the blood flow image formation unit. Subsequently, the execution of the main measurement is started.

Figure 9:
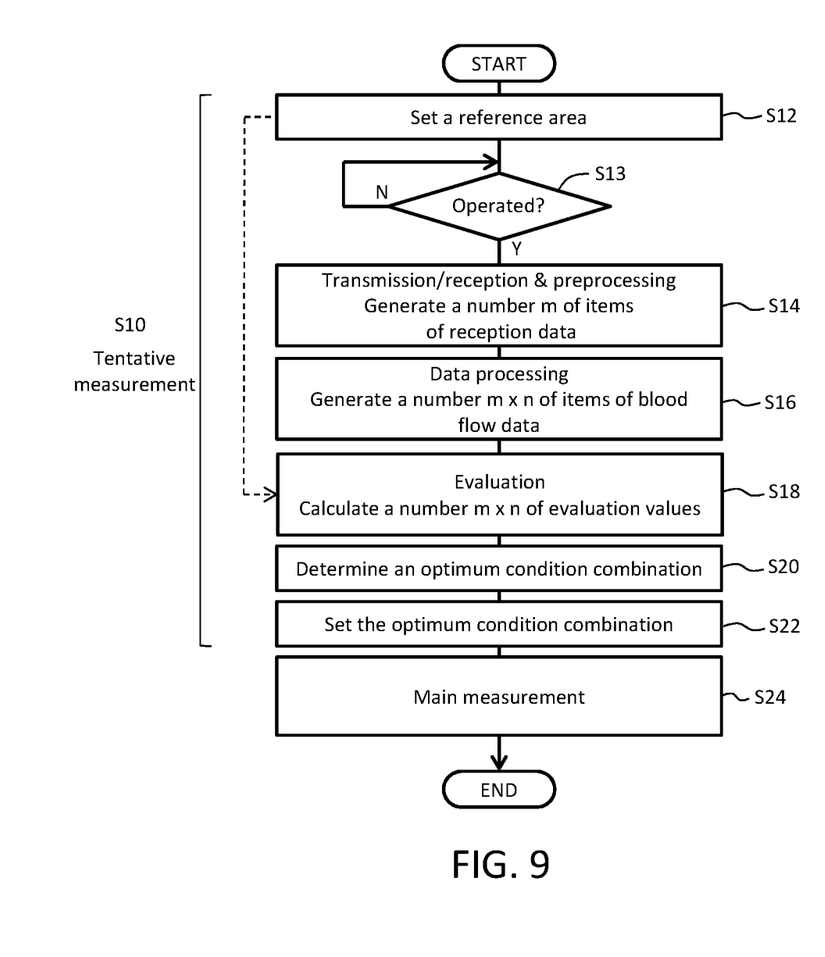
FIG. 9 is a flowchart illustrating an example operation.

FIG. 9 illustrates an example operation of the ultrasound diagnostic apparatus. S10 corresponds to the tentative measurement step, and S24 corresponds to the main measurement step. In S12, a reference area is set by a user who has referred to a tomographic image. In S13, whether or not an automatic optimization button has been operated is determined. If operated, in S14, transmission/reception of ultrasound is performed to generate a number m of items of reception data. In this process, packet decimation processing is performed as needed. In S16, a number n of units of data processing are applied to each of the number m of items of reception data, thereby generating a number m×n of items of blood flow data. In S18, a number m×n of evaluation values are calculated based on the number m×n of items of blood flow data. In S20, the best evaluation value is determined from among the number m×n of evaluation values, thereby determining an optimum condition combination. In S22, an optimum transmission/reception condition and an optimum data processing condition which constitute a combination of optimum conditions are set for the ultrasound diagnostic apparatus. Subsequently, the main measurement is performed.

Figure 10:
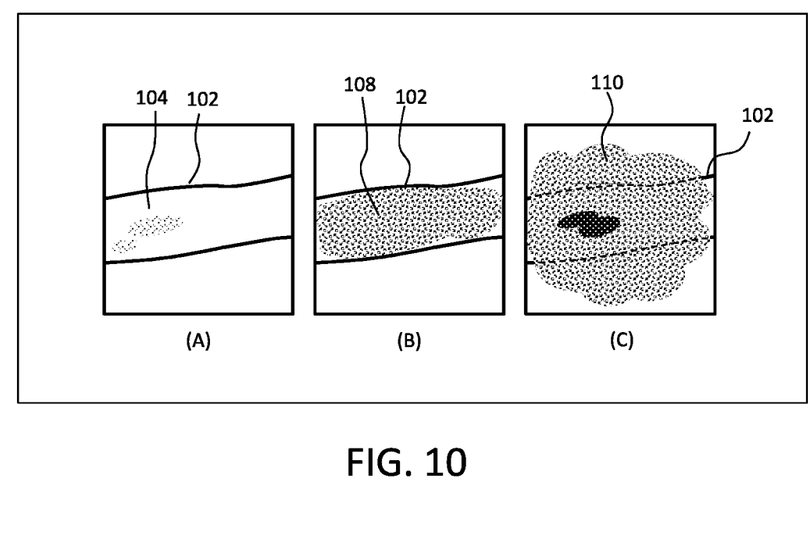
FIG. 10 is an illustrative diagram of an effect obtainable by optimization.

FIG. 10 shows CFM images. (A) shows a CFM image that barely displays an image 104 of blood flow in a blood vessel 102; that is, in an under-displayed state. In contrast, (C) shows a CFM image that displays an image 110 of blood flow beyond the blood vessel 102; that is, in an over-displayed state. Manual adjustments to a plurality of parameters for resolving the under-displayed state or the over-displayed state; in other words, for obtaining a good CFM image are complicated and time-consuming.

The method according to an embodiment of the present disclosure enables automatically setting an optimum condition combination in a short time, thereby obtaining a good CFM image as shown in (B) of FIG. 10. In that CFM image, a clear image 108 of blood flow appears in the blood vessel 102. This embodiment enables a reduced burden on the inspector and also enables a reduced burden on the subject simultaneously. If, for example, m×n is limited to 500 or less, or thousands or less, as the tentative measurement can be completed within one second or within a few seconds, a delayed start of the main measurement causes no problem. As the tentative measurement and the main measurement are performed on the same subject, a further advantage is obtained in that an optimum condition combination can be set for each subject.

The invention claimed is:

1. An ultrasound diagnostic apparatus comprising:
a first generator that generates a reception data array that is composed of a plurality of items of reception data corresponding to a plurality of transmission/reception conditions which are different from each other, the plurality of items of reception data corresponding to a number m of items of reception data, and the plurality of transmission/reception conditions corresponding to a number m of transmission/reception conditions;
a second generator that generates a plurality of items of blood flow data by applying a plurality, corresponding to a number n, of data processing conditions, which are different from each other, to each of the plurality of items of reception data, and generates a blood flow data set from the reception data array, the blood flow data set comprising a number (m×n) of items of blood flow data;
an evaluator that evaluates the blood flow data set, and determines an optimum transmission/reception condition, which is a specific transmission/reception condition among the plurality of transmission/reception conditions, and an optimum data processing condition which is a specific data processing condition among the plurality of data processing conditions,
the specific transmission/reception condition and the specific data processing condition being simultaneously optimized such that a quality of an image obtained with imaging under the specific transmission/reception condition and the specific data processing condition is greater than that obtained with imaging under others of the plurality of transmission/reception conditions and the plurality of data processing conditions,
the evaluator comprising:
a calculator that calculates an evaluation value for each item of the items of blood flow data; and
a determiner that determines the optimum transmission/reception condition and the optimum data processing condition based on the plurality of evaluation values corresponding to the plurality of items of blood flow data;
a setter that sets an operation condition for the ultrasound diagnostic apparatus, to an optimum condition combination including the optimum transmission/reception condition and the optimum data processing condition; and
a blood flow image formation unit that forms a blood flow image based on a plurality of reception beam data collected in main measurement, under the operation condition set for the ultrasound diagnostic apparatus.

2. The ultrasound diagnostic apparatus according to claim 1, wherein the first generator comprising:
a transmission/reception circuit for which at least one actual transmission/reception condition is set, and that outputs at least one item of actual reception data; and
a processor that processes the at least one item of actual reception data, thereby generating at least one item of virtual reception data corresponding to at least one virtual transmission/reception condition,
wherein the plurality of transmission/reception conditions are composed of the at least one actual transmission/reception condition and the at least one virtual transmission/reception condition, and
wherein the reception data array is composed of the at least one item of actual reception data and the at least one item of virtual reception data.

3. The ultrasound diagnostic apparatus according to claim 2,
wherein the at least one actual transmission/reception condition comprises a plurality of actual transmission/reception conditions,
wherein the at least one item of actual reception data comprises a plurality of items of actual reception data,
wherein the at least one virtual transmission/reception condition comprises a plurality of virtual transmission/reception conditions, and
wherein the at least one item of virtual reception data comprises a plurality of items of virtual reception data.

4. The ultrasound diagnostic apparatus according to claim 2,
wherein each of the at least one item of actual reception data comprises a plurality of packets that are successive on a time axis and that were obtained under the same actual transmission/reception condition, and
wherein the processor applies packet decimation processing to each of the at least one item of actual reception data, thereby generating the at least one item of virtual reception data from each of the at least one item of actual reception data.

5. The ultrasound diagnostic apparatus according to claim 1,
wherein a reference area is set for a blood flow area on a beam scanning plane,
wherein the calculator refers to a portion corresponding to the reference area in each of the plurality of items of blood flow data as blood flow information,
wherein the calculator refers to all of each of the plurality of items of blood flow data or a portion other than the portion corresponding to the reference area in each of the plurality of items of blood flow data as comparative information, and
wherein the calculator calculates, for each of the plurality of items of blood flow data, the evaluation value based on the blood flow information and the comparative information.

6. The ultrasound diagnostic apparatus according to claim 1,
wherein each of the transmission/reception conditions includes a transmission pulse repetition time,
wherein each of the data processing conditions includes a filter characteristic,
wherein the optimum transmission/reception condition includes an optimum transmission pulse repetition time, and
wherein the optimum data processing condition includes an optimum filter characteristic.

7. A method performed by an ultrasound diagnostic apparatus for setting an operation condition for the ultrasound diagnostic apparatus, the method comprising:
generating a reception data array that is composed of a plurality of items of reception data corresponding to a plurality of transmission/reception conditions which are different from each other, the plurality of items of reception data corresponding to a number m of items of reception data, and the plurality of transmission/reception conditions corresponding to a number m of transmission/reception conditions;
generating a plurality of items of blood flow data by applying a plurality, corresponding to a number n, of data processing conditions, which are different from each other, to each of the plurality of items of reception data, and generating a blood flow data set from the reception data array, the blood flow data set comprising a number m×n of items of blood flow data;
evaluating the blood flow data set, and determining an optimum transmission/reception condition, which is a specific transmission/reception condition among the plurality of transmission/reception conditions, and an optimum data processing condition which is a specific data processing condition among the plurality of data processing conditions,
the specific transmission/reception condition and the specific data processing condition being simultaneously optimized such that a quality of an image obtained with imaging under the specific transmission/reception condition and the specific data processing condition is greater than that obtained with imaging under others of the plurality of transmission/reception conditions and the plurality of data processing conditions;
calculating an evaluation value for each item of the items of blood flow data;
determining the optimum transmission/reception condition and the optimum data processing condition based on the plurality of evaluation values corresponding to the plurality of items of blood flow data; and
setting the operation condition for the ultrasound diagnostic apparatus to an optimum condition combination including the optimum transmission/reception condition and the optimum data processing condition; and
forming a blood flow image based on a plurality of reception beam data collected in main measurement, under the operation condition set for the ultrasound diagnostic apparatus.

8. The method according to claim 7 further comprising:
setting at least one actual transmission/reception condition, and supplying at least one item of actual reception data; and
processing the at least one item of actual reception data, to generate at least one item of virtual reception data corresponding to at least one virtual transmission/reception condition,
wherein the plurality of transmission/reception conditions are composed of the at least one actual transmission/reception condition and the at least one virtual transmission/reception condition, and wherein the reception data array is composed of the at least one item of actual reception data and the at least one item of virtual reception data.

9. The method according to claim 8, wherein
the at least one actual transmission/reception condition comprises a plurality of actual transmission/reception conditions,
the at least one item of actual reception data comprises a plurality of items of actual reception data,
the at least one virtual transmission/reception condition comprises a plurality of virtual transmission/reception conditions, and
the at least one item of virtual reception data comprises a plurality of items of virtual reception data.

10. The method according to claim 8, wherein
each of the at least one item of actual reception data comprises a plurality of packets that are successive on a time axis and that were obtained under the same actual transmission/reception condition, and
the method further comprises applying packet decimation processing to each of the at least one item of actual reception data, to generate the at least one item of virtual reception data from each of the at least one item of actual reception data.

11. The method according to claim 7 further comprising:
setting a reference area for a blood flow area on a beam scanning plane;
referring to a portion corresponding to the reference area in each of the plurality of items of blood flow data as blood flow information;
referring to all of each of the plurality of items of blood flow data or a portion other than the portion corresponding to the reference area in each of the plurality of items of blood flow data as comparative information; and
calculating, for each of the plurality of items of blood flow data, the evaluation value based on the blood flow information and the comparative information.

12. The method according to claim 7, wherein
each of the transmission/reception conditions includes a transmission pulse repetition time,
each of the data processing conditions includes a filter characteristic,
the optimum transmission/reception condition includes an optimum transmission pulse repetition time, and
the optimum data processing condition includes an optimum filter characteristic.

* * * * *